United States Patent
Kim et al.

(10) Patent No.: US 11,538,289 B2
(45) Date of Patent: Dec. 27, 2022

(54) ARTIFICIAL INTELLIGENCE DEVICE MOUNTED ON VEHICLE TO PERFORM SELF-DIAGNOSIS, AND METHOD FOR THE SAME

(71) Applicant: LG Electronics Inc., Seoul (KR)

(72) Inventors: Jaehong Kim, Seoul (KR); Heeyeon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 492 days.

(21) Appl. No.: 16/591,231

(22) Filed: Oct. 2, 2019

(65) Prior Publication Data

US 2020/0035045 A1    Jan. 30, 2020

(30) Foreign Application Priority Data

Jul. 23, 2019  (KR) .................. 10-2019-0089167

(51) Int. Cl.
    G07C 5/00   (2006.01)
    G07C 5/08   (2006.01)
    G06N 3/08   (2006.01)
    G06N 3/04   (2006.01)

(52) U.S. Cl.
    CPC ......... *G07C 5/0808* (2013.01); *G06N 3/0454* (2013.01); *G06N 3/08* (2013.01); *G07C 5/085* (2013.01)

(58) Field of Classification Search
    CPC .... G07C 5/0808; G07C 5/085; G06N 3/0454; G06N 3/08
    See application file for complete search history.

(56) References Cited

U.S. PATENT DOCUMENTS

| | | | |
|---|---|---|---|
| 10,351,087 B2 * | 7/2019 | Wakabayashi | B60R 21/0134 |
| 10,688,949 B2 * | 6/2020 | Okamura | B60R 21/0132 |
| 2007/0043485 A1 * | 2/2007 | Meissner | G01M 17/00 701/29 |
| 2013/0035827 A1 * | 2/2013 | Breed | B60R 21/0132 701/45 |
| 2018/0154906 A1 * | 6/2018 | Dudar | B60W 50/029 |
| 2019/0180526 A1 * | 6/2019 | Mehdizade | G07C 5/0808 |
| 2019/0279447 A1 * | 9/2019 | Ricci | G07C 9/00158 |
| 2020/0229395 A1 * | 7/2020 | Ruholl | A01K 5/0266 |
| 2020/0320802 A1 * | 10/2020 | Yang | G07C 5/0808 |

FOREIGN PATENT DOCUMENTS

JP   2020075565 A * 11/2018 ............. B60R 21/00

OTHER PUBLICATIONS

Jeong, Y., "An Integrated Self-Diagnosis System for an Autonomous Vehicle Based on an IoT Gateway and Deep Learning", Jun. 18, 2018, MDPI (Year: 2018).*

* cited by examiner

*Primary Examiner* — Gertrude Arthur Jeanglaude
*Assistant Examiner* — Brittany Renee Peko
(74) *Attorney, Agent, or Firm* — Fish & Richardson P.C.

(57) ABSTRACT

An artificial intelligence device mounted on a vehicle is provided. A sensing unit acquires a gyroscope sensor value, an acceleration sensor value, a GPS sensor value, and a proximity sensor value. If the acquired data satisfies a predetermined reference value, a processor inputs the acquired sensor values to an artificial intelligence model, acquires whether an impact requiring self-diagnosis occurs and impact direction information as a result value, selects an ECU module to perform self-diagnosis according to the acquired result value, and performs self-diagnosis.

17 Claims, 8 Drawing Sheets

FIG. 11
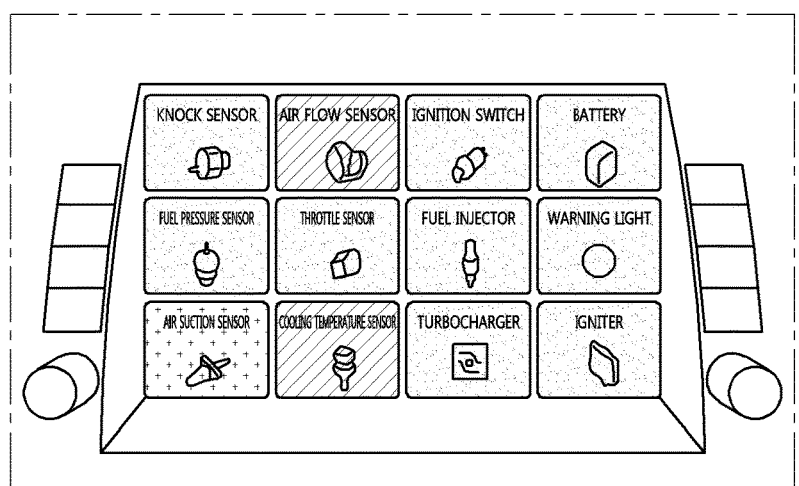
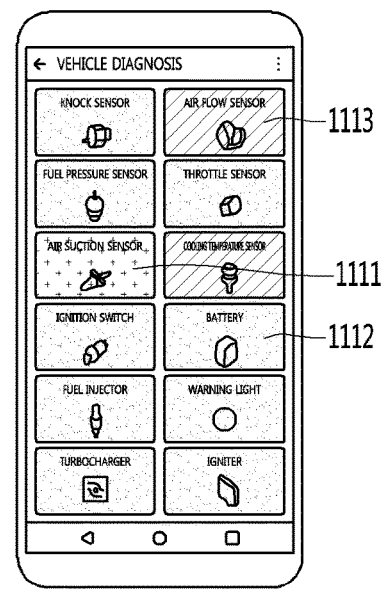
(a)            (b)

ARTIFICIAL INTELLIGENCE DEVICE MOUNTED ON VEHICLE TO PERFORM SELF-DIAGNOSIS, AND METHOD FOR THE SAME

CROSS-REFERENCE TO RELATED APPLICATIONS

The present application claims the benefits of priority to Korean Patent Application No. 10-2019-0089167 filed on Jul. 23, 2019, which is herein incorporated by reference in its entirety.

BACKGROUND

The present invention relates to an artificial intelligence device mounted on a vehicle, which, if vehicle impact occurs, determines whether the impact requires self-diagnosis by using values of a GPS sensor, a gyroscope sensor, a proximity sensor, and an acceleration sensor, and if it is determined that the impact requires the self-diagnosis, infers an impact direction, sets an electronic control unit (ECU) module requiring the self-diagnosis based on the impact direction, and performs the self-diagnosis.

With the development of the vehicle and computer performance, an electronic control unit (ECU) controls most of a vehicle, such as automatic transmission control, driving system, braking system, and steering system.

With the recent development of IT technology, a large number of services that are close to the connected car concept are provided. However, services provided by most automotive OEMs do not support real-time monitoring and diagnosis for various ECUs. Therefore, in many cases, post-diagnosis is performed on the failure or replacement time of automobile parts. The current automotive diagnostic technology is based on the on-board diagnostics standard. According to the standard, information about the main system of the vehicle or failure information transmitted from sensors attached to the vehicle to the ECU can be viewed at the external device of the vehicle by using the serial communication function.

SUMMARY

Modern vehicle diagnosis technologies are based on key vehicle information transmitted from the attached sensors to the electronic control unit according to the standard. The electronic diagnostic system of the electronic control unit is becoming a standardized diagnostic system. However, according to such a diagnostic system, even if a warning light occurs in a vehicle, it is difficult to exactly find out which ECU module has a problem. As a result, it is necessary to check regularly or visit a service center so as to exactly find out what was wrong with the modules mounted on the vehicle.

The present invention has been made in an effort to solve the above problems and provides an artificial intelligence device and a method for the same, wherein the artificial intelligence device acquires a variety of sensor data when impact of a vehicle occurs, determines whether to perform self-diagnosis and an impact direction by using the acquired sensor data, performs self-diagnosis on a damaged ECU, and outputs a self-diagnosis result.

In one embodiment of the present invention, an artificial intelligence device mounted on a vehicle may input data acquired from a gyroscope sensor, a GPS sensor, and an acceleration sensor to an artificial intelligence model, determine an impact requiring self-diagnosis and an impact direction as a result value of the artificial intelligence mode, determine ECU modules to perform self-diagnosis in an order closer to the impact direction, and perform self-diagnosis.

The artificial intelligence model may include a neural network whose weight is adjusted The artificial intelligence model includes a neural network whose weight is adjusted by training using impact information as a result value and sensing value of a GPS sensor, a gyroscope sensor, and an acceleration sensor as an input value, and the impact information indicates information about an impact that does not require self-diagnosis, information about an impact that requires self-diagnosis in a first direction, information about an impact that requires self-diagnosis in a second direction.

In one embodiment of the present invention, the sensing unit may further include a proximity sensor. If the proximity sensor value is less than or equal to a first reference value, data acquired from the gyroscope sensor, the acceleration sensor, the GPS sensor, and the proximity sensor may be input to the artificial intelligence mode. In addition, if the proximity sensor value is less than or equal to the first reference value, if the gyroscope sensor value is greater than or equal to a second reference value, and if the proximity sensor value is less than or equal to the first reference value and the acceleration sensor value is less than or equal to a third reference value, data acquired from the gyroscope sensor, the acceleration sensor, the GPS sensor, and the proximity sensor may be input to the artificial intelligence model.

In one embodiment of the present invention, the processor may control the output unit so that, if the self-diagnosis result of the ECU module is abnormal or warning, this is output, and the processor may provide abnormality diagnosis information to the service center.

The details of one or more embodiments are set forth in the accompanying drawings and the description below. Other features will be apparent from the description and drawings, and from the claims.

BRIEF DESCRIPTION OF THE DRAWINGS

FIG. 11 illustrates a notification display according to an embodiment of the present invention.

DETAILED DESCRIPTION OF THE EMBODIMENTS

Figure 1:
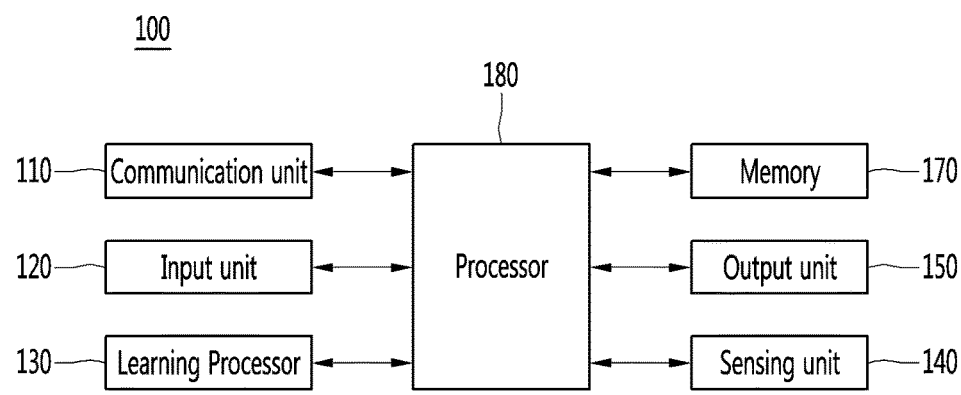
FIG. 1 illustrates an artificial intelligence (AI) device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
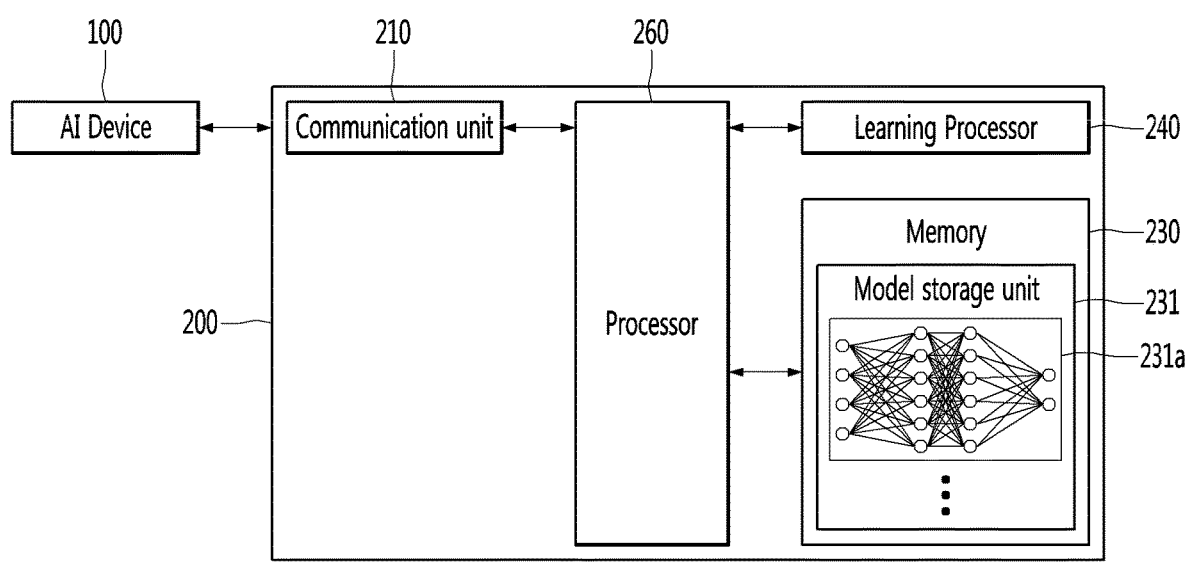
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
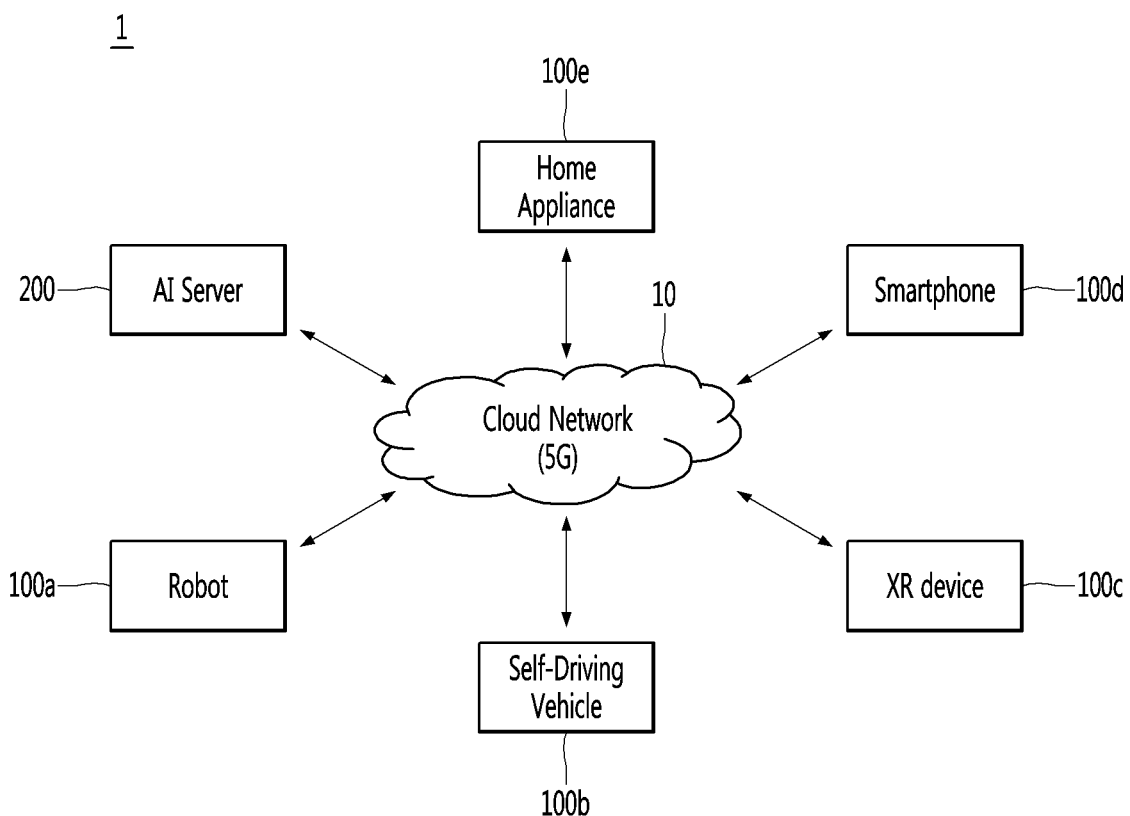
FIG. 3 is a diagram illustrating an AI system 1 according to an embodiment of the present invention.

FIG. 3 illustrates an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

AI+Robot

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

The sensing unit 140 may include one or more sensors for sensing at least one of information in the mobile AI device, surrounding environment information surrounding the mobile AI device, or user information. For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g. a camera 121)), a microphone 122, a battery gauge, an environmental sensor (e.g. a barometer, a hygrometer, a thermometer, a radiation sensor, a heat detection sensor, a gas detection sensor, etc.), or a chemical sensor (e.g., an electronic nose, a healthcare sensor, a biometric sensor, etc.). Meanwhile, the AI device disclosed herein may utilize a combination of pieces of information sensed by at least two sensors.

The sensing unit 140 may include various sensors. In detail, the sensor refers to a device that detects specific information from an object to be measured and converts the detected specific information into an electrical signal. The sensing unit 140 may include an acceleration sensor, a gyroscope sensor, and a proximity sensor. The proximity sensor refers to a non-contact detection sensor that determines the presence or absence of the object when the object is in close proximity, and the acceleration sensor refers to a sensor that detects the change of the object velocity per unit time and detects dynamic force such as acceleration, vibration, and impact. The gyroscope sensor refers to a sensor that detects the inertia of the object by an electrical signal and mainly detects the rotation angle. The gyroscope sensor can detect height, rotation, and tilt, thereby enabling sophisticated motion sensing.

The output unit 150 generates an output related to a visual sense, an auditory sense, or a haptic sense. The output unit 150 may include at least one of a display unit 151, a sound output unit 152, a haptic module 153, or an optical output unit 154.

The display unit 151 displays (outputs) information processed by the AI device 100. For example, the display unit 151 may display execution screen information of an application program running on the AI device 100, or UI or graphic user interface (GUI) information according to the execution screen information.

The display unit 151 may form a layer structure with a touch sensor, or may be integrally formed with the touch sensor, thereby implementing a touch screen. The touch screen may function as a user input unit 123 that provides an input interface between the AI device 100 and the user, and may also provide an output interface between the AI device 100 and the user.

The sound output unit 152 may output audio data received from the wireless communication unit 110 in a call signal reception mode, a call mode or a record mode, a voice recognition mode, and a broadcast reception mode, or may output audio data stored in the memory 170. Hereinafter, FIG. 4 is described.

According to one embodiment of the present invention, the AI device mounted on the vehicle may include: a sensing unit configured to acquire sensor data when impact occurs; an output unit configured to output information; and a processor configured to input data acquired by the sensing unit to an AI model to obtain a result value output by the AI model, determine whether to perform self-diagnosis and an impact direction according to the result value, and control the output unit to output a self-diagnosis result based on the impact direction if the self-diagnosis is performed on an ECU module.

Figure 4:
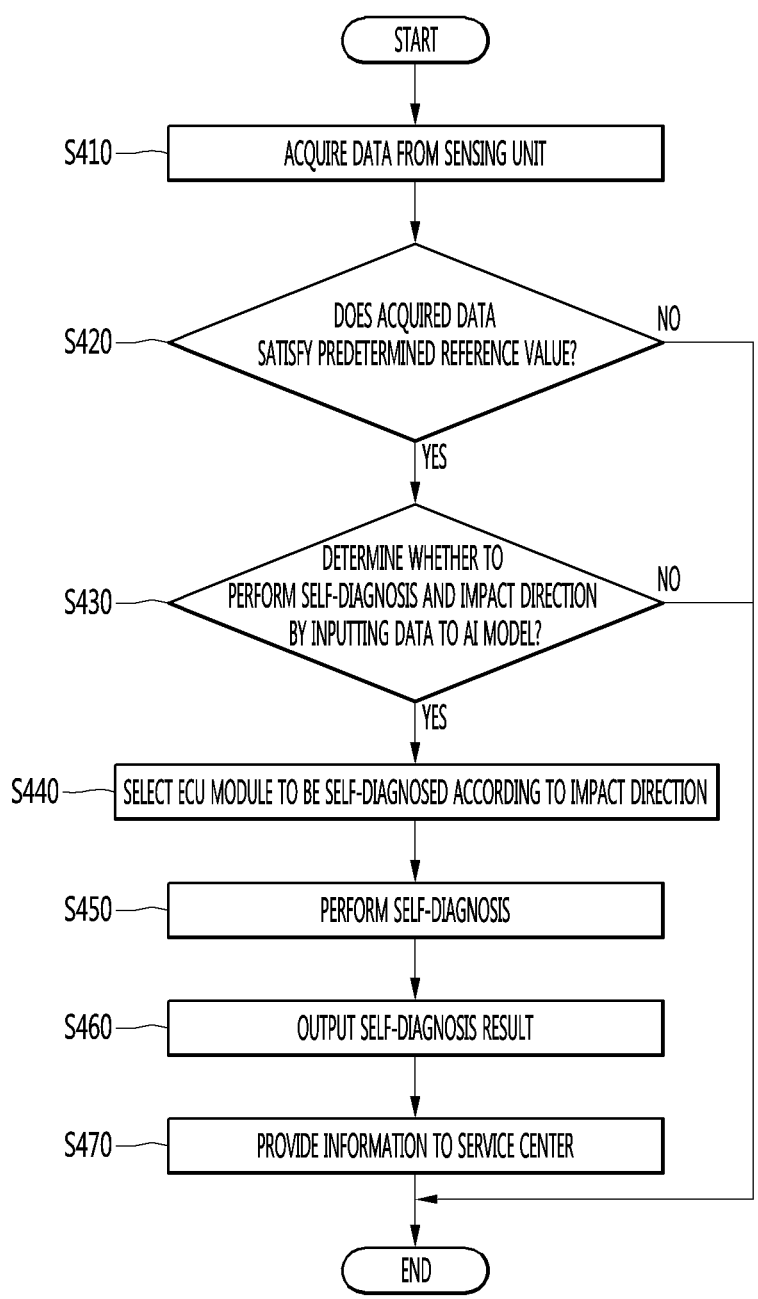
FIG. 4 is an overall flowchart according to an embodiment of the present invention.

FIG. 4 is an overall flowchart according to an embodiment of the present invention.

Referring to FIG. 4, the AI device mounted on the vehicle may perform: acquiring, by the sensing unit 140, data (S410); determining, by the processor 180, whether the data acquired by the sensing unit satisfies a predetermined reference value (S420); inputting, by the processor 180, the acquired data to the AI model to determine whether to perform self-diagnosis and an impact direction (S430); selecting an ECU module to be self-diagnosed according to the impact direction; performing the self-diagnosis (S450); outputting a self-diagnosis result (S460); and providing the corresponding information to a service center (S470). First, operation S410 of acquiring, by the sensing unit 140, the sensor data when the impact occurs will be described.

The sensing unit 140 acquires data in relation to the sensing target object (S410). The sensing target object refers to all targets (objects or walls, etc.) that collide with the vehicle to generate the impact, but the present invention is not limited thereto.

The data may include a value obtained from a GPS sensor mounted on the vehicle, a proximity sensor value, an acceleration sensor value, and a gyroscope sensor value.

Next, the processor 180 may determine whether the acquired data satisfies a predetermined reference value by receiving or sensing the acquired data through the sensing unit 140 (S420). Hereinafter, operation S420 is described in detail.

It is inefficient to input all the data acquired by the sensing unit 140 to the AI model. Therefore, the processor 180 does not immediately use the data acquired by the sensing unit 140 as the input value of the AI model, and may first determine whether to the acquired data is used as the input value of the AI model through the comparison between a predetermined reference value and each sensor value. In detail, FIGS. 5 and 6 are described.

Figure 5:
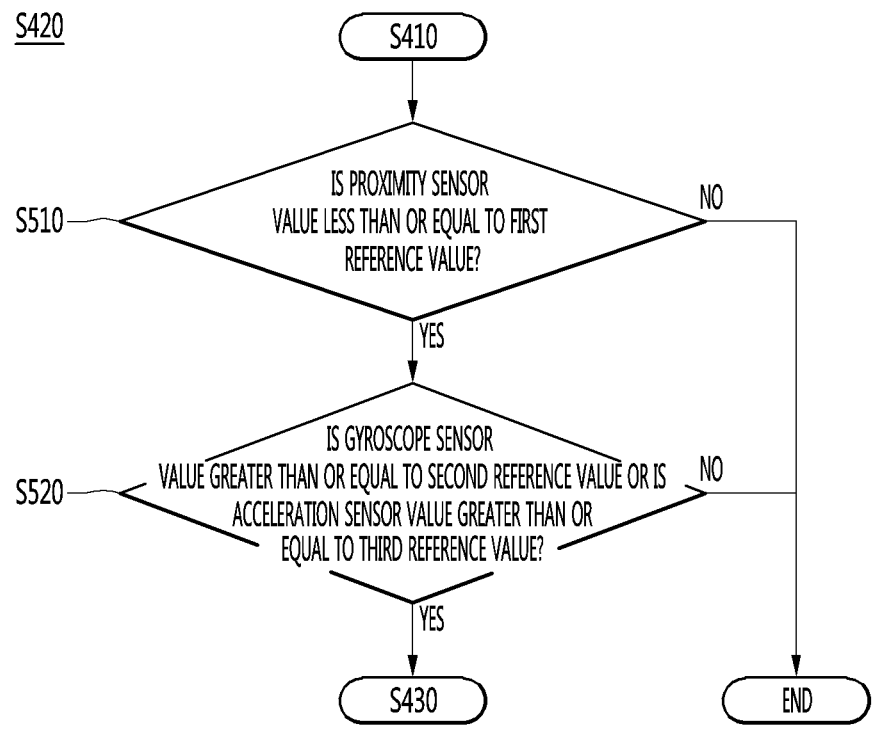
FIG. 5 is a flowchart according to an embodiment of the present invention.
Figure 6:
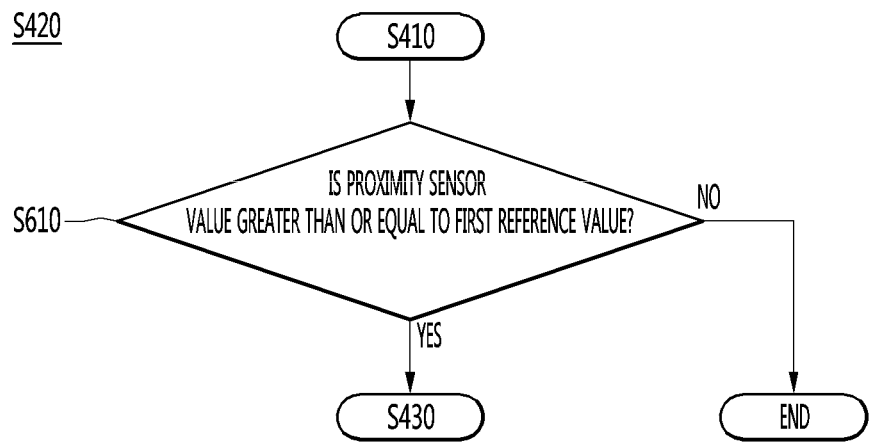
FIG. 6 is a flowchart according to an embodiment of the present invention.

FIG. 5 is a flowchart according to an embodiment of the present invention.

Referring to FIG. 5, the processor 180 may determine whether the proximity sensor value among the data acquired by the sensing unit 140 is less than or equal to a first reference value (S510). Thereafter, the processor 180 may determine whether the gyroscope sensor value is greater than or equal to a second reference value or the acceleration sensor value is greater than or equal to a third reference value (S520).

In detail, if there occurs an impact that requires self-diagnosis on the ECU module of the vehicle, the vehicle and the colliding target object come close to each other. In this case, the proximity sensor value acquired by the sensing unit 140 is equal to or smaller than the length of the vehicle body. Therefore, the processor 180 may previously determine the case where the proximity sensor value is less than or equal to the first reference value, and primarily determine whether the proximity sensor value is eligible to be the input value of the AI model.

According to one embodiment of the present invention, in the case where the vehicle collides with the target object when a plurality of proximity sensors are mounted on the vehicle, the processor 180 may acquire the smallest proximity sensor value among the acquired proximity sensor values, and determine whether the acquired proximity sensor value is less than or equal to the first reference value.

Specifically, the minimum value of the proximity sensor values acquired when the vehicle collides with the target object may be smaller than the length of the vehicle body. For example, if the proximity sensor having the minimum value is located in the front of the vehicle and the right front of the vehicle collides with the target object, the proximity sensor value may have a value smaller than the length of the vehicle body of the vehicle.

As another example, if the proximity sensor having the minimum value is located in the front of the vehicle, the proximity sensor value may have a value close to zero when the front of the vehicle collides with the target object. In addition, in the case of the vehicle including one proximity sensor, if the proximity sensor is located in the front and the collision between the target object and the vehicle occurs at the rear side, the proximity sensor value may be equal to the length of the vehicle body. In this case, the processor 180 may acquire the smallest proximity sensor value among the acquired proximity sensor values, and determine whether the acquired proximity sensor value is less than or equal to the first reference value.

According to one embodiment of the present invention, after determining whether the proximity sensor value is less than or equal to the first reference value (S510), the processor 180 may determine whether the acquired gyroscope sensor value is greater than or equal to the second reference value, or whether the acceleration sensor value is greater than or equal to the third reference value (S520).

Specifically, even if the proximity sensor value is less than or equal to the first reference value, whether the impact requires self-diagnosis due to component damage may be a collision in a situation where a speed above a predetermined value or an angular speed above a predetermined value is detected. Therefore, by previously determining whether the gyroscope sensor value is greater than or equal to the second reference value, or whether the acceleration sensor value is greater than or equal to the third reference value, it may be primarily determined whether the sensor value is eligible to be the input value of the AI model.

For example, if the vehicle is parked in a parking lot or if the driving lane is narrow and comes close to the target object, the minimum value of the proximity sensor values may satisfy the first reference value or less. In this case, if the angular velocity value sensed using the gyroscope sensor is less than or equal to the second reference value or the acceleration value sensed using the acceleration sensor is less than or equal to the third reference value, the sensor value cannot be the input value of the AI model.

Meanwhile, in another example, if the vehicle collides with the target object due to sudden start, the proximity sensor value satisfies the first reference value or less, and the acceleration sensor value has a value greater than or equal to the third reference value. As another example, if the vehicle sharply rotates and collides with the target object, the proximity sensor value satisfies the first reference value or less, and the gyroscope sensor value has a value greater than or equal to the second reference value.

In this case, the processor 180 may determine whether the acquired gyroscope sensor value is greater than or equal to the second reference value or whether the acceleration sensor value is greater than or equal to the third reference value, so as to primarily determine whether the impact requires the self-diagnosis. The first, second, and third reference values may be values set by a developer based on empirical rules or experiments.

Meanwhile, according to one embodiment of the present invention, operation S510 or S520 may be omitted or merged.

An example in which operations S510 and S520 are merged may include a case where the proximity sensor value is less than or equal to the first reference value and the gyroscope sensor value is greater than or equal to the second reference value, and a case where the proximity sensor value is less than or equal to the first reference value and the acceleration sensor value is greater than or equal to the third reference value.

In addition, an example in which operation S520 is omitted may include a case where the proximity sensor value is less than or equal to the first reference value. Hereinafter, details will be described with reference to FIG. 6.

FIG. 6 is a flowchart according to an embodiment of the present invention.

Referring to FIG. 6, the processor 180 may determine whether the proximity sensor value among the data acquired by the sensing unit 140 is less than or equal to the first reference value (S610). Thereafter, the processor 180 proceeds to next operation S430.

For example, if the vehicle collides with the target object while driving at a constant speed and the impact occurs, the gyroscope sensor value and the acceleration sensor value have values close to zero and thus cannot be the input value of the AI model.

In this case, the processor 180 may omit operation S520. If the proximity sensor value is less than or equal to the first reference value, the sensor value may be the input value of the AI model in next operation S430. The first reference value may be a value set by the developer based on empirical rules or experiments.

Next, the processor 180 may input the data acquired by the sensing unit 140 to the AI model to obtain a result value output by the AI model, and may determine whether to perform the self-diagnosis and the impact direction according to the result value. Hereinafter, details will be described with reference to FIG. 7.

Figure 7:
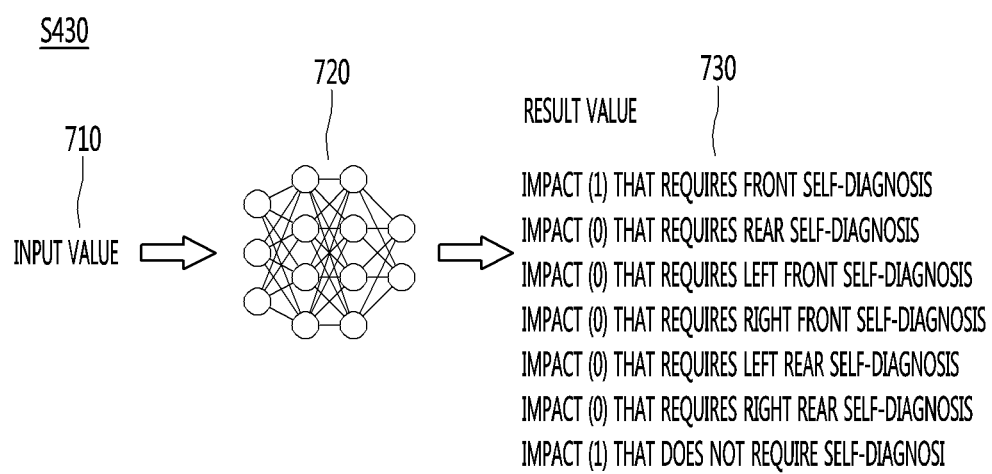
FIG. 7 illustrates an AI model according to an embodiment of the present invention.

FIG. 7 illustrates an AI model according to an embodiment of the present invention.

If the data acquired through the sensing unit 140 satisfies the predetermined reference value, the processor 180 inputs the corresponding data to the AI model and determines whether the impact is required to perform the self-diagnosis and the impact direction (S430).

Referring to FIG. 7, the AI model 720 may be configured as an artificial neural network. The AI model 720 may include a neural network whose weight is adjusted by training using impact information 730 as a result value and sensing values of a GPS sensor, a gyroscope sensor, and an acceleration sensor as an input value 710. The result value may include a case where only one result value is True(1) and the others are False(0) by one-hot encoding.

The impact information may include information about impact that does not require self-diagnosis, information about impact that requires self-diagnosis in a first direction, and information about impact that requires self-diagnosis in a second direction. The first direction and the second direction are not limited to specific directions.

For example, the result value 730 may include a case where an impact that requires self-diagnosis is applied to the front, a case where an impact that requires self-diagnosis is applied to the rear, a case where an impact that requires self-diagnosis is applied to the left side, a case where an impact that requires self-diagnosis is applied to the right front, a case where an impact that requires self-diagnosis is applied to the left rear, a case where an impact that requires self-diagnosis is applied to the right rear, and a case where an impact that does not require self-diagnosis is applied.

According to one embodiment of the present invention, the training data of the AI model 720 may be data obtained from the GPS sensor, the gyroscope sensor, and the acceleration sensor in the vector form.

In the training process of the AI model 720, the AI model 720 may configure training data and a label corresponding to the training data (whether the impact requires self-diagnosis and the impact direction) as one training set according to each result value, and the training data and the label may be input to the AI model 720 in the form of the training set.

As a method for collecting the training set of the AI model 720, data stored in the AI server 200 or the cloud may be used, and information stored in the memory 170 inside the AI device 100 may be used. In addition, the processor 180 may use the model learned by the learning processor 130 of the AI device 100, and may use the model learned by the learning processor 240 of the AI server 200.

The AI model 720 may infer the function of the correlation between training data (GPS sensor value, gyroscope sensor value, and acceleration sensor value) and labeling data (whether the impact requires self-diagnosis and the impact), and may determine (optimize) the weights and parameters of the deep learning model through the evaluation of the inferred function.

According to one embodiment of the present invention, the sensing unit 140 may further include a proximity sensor, and the processor 180 may further input a proximity sensor value to the AI model 720. In other words, the accuracy may be improved by adding the proximity sensor value in the training process and the using process of the AI model.

According to one embodiment of the present invention, if the data acquired by the sensing unit 140 satisfies a predetermined reference value, the processor 180 may input data acquired from the gyroscope sensor, the acceleration sensor, and the GPS sensor to the AI model.

In addition, the processor may input data acquired from the gyroscope sensor, the acceleration sensor, the GPS sensor, and the proximity sensor to the AI model.

According to one embodiment of the present invention, the AI model for determining whether the impact requires self-diagnosis and the impact direction by inputting the data acquired by the sensing unit 140 to the AI model may include a plurality of AI models. Hereinafter, FIGS. 8 and 9 are described.

Figure 8:
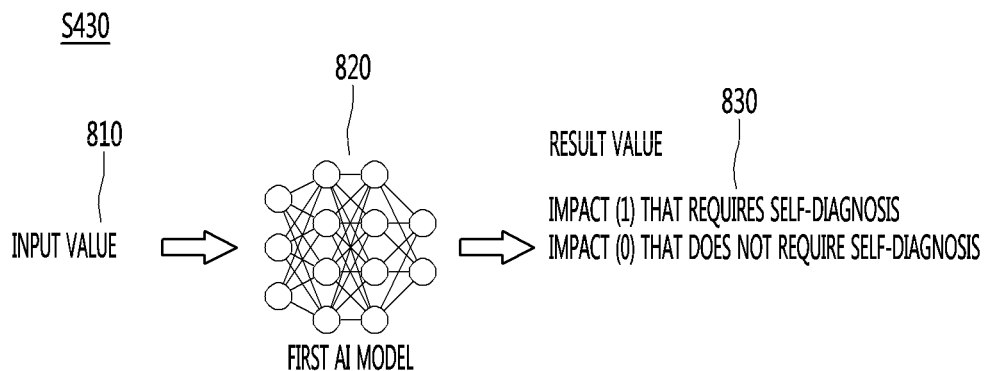
FIG. 8 illustrates a first AI model according to an embodiment of the present invention.
Figure 9:
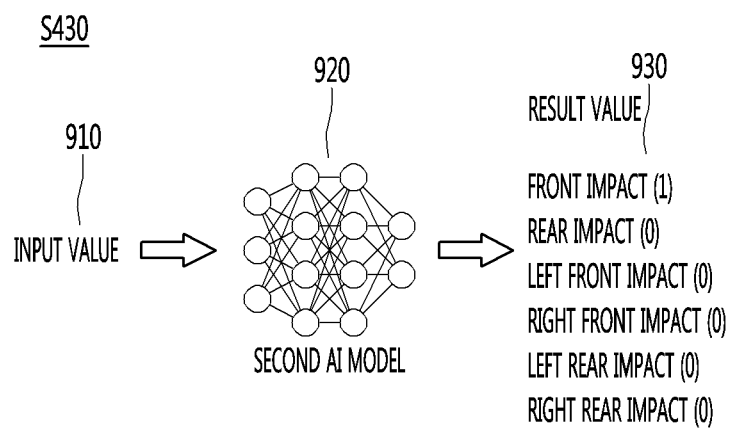
FIG. 9 illustrates a second AI model according to an embodiment of the present invention.

FIG. 8 illustrates a first AI model according to an embodiment of the present invention.

According to one embodiment of the present invention, the AI model may include a first AI model 820 whose weight is adjusted by training using whether the impact requires the self-diagnosis as a result value and sensing values of a gyroscope sensor and an acceleration sensor as an input value 810. The result value may include a case where only one result value is True(1) and the others are False(0) by one-hot encoding.

For example, if an angular velocity value obtained by the gyroscope sensor is high or the acceleration value acquired by the acceleration sensor is high, the first AI model 820 may output the impact requiring the self-diagnosis as the result value.

According to one embodiment of the present invention, the sensing unit 140 may further include a proximity sensor, and the processor 180 may further input a proximity sensor value to the AI model 820. In other words, the accuracy may be improved by adding the proximity sensor value in the training process and the using process of the AI model.

FIG. 9 illustrates a second AI model according to an embodiment of the present invention.

According to one embodiment of the present invention, the AI model may include a second AI model 920 whose weight is adjusted by training using an impact direction 930 as a result value and sensing values of a GPS sensor, a gyroscope sensor and an acceleration sensor as an input value 910.

The result value may include a case where only one result value is True(1) and the others are False(0) by one-hot encoding.

Specifically, the AI model requires a large amount of computation until starting from an input layer and passing through a hidden layer to derive a result value. Therefore, in the present invention, whether the impact requires self-diagnosis is determined by using the first AI model 820, and if the impact requires the self-diagnosis, the impact direction (result value) may be determined by using the second AI model 920

For example, if the collision occurs, the coordinate data acquired according to the GPS sensor changes rapidly with respect to the vehicle. In this case, the second AI model 920 may determine the impact direction based on the result value 930 by using the change amount of coordinate data for each direction of the GPS sensor and the gyroscope sensor value or the acceleration sensor value.

Specifically, according to one embodiment of the present invention, the result value 930 of the second AI model 920 may include a plurality of directions. That is, the impact may include an impact that requires self-diagnosis in the first direction and an impact that requires self-diagnosis in the second direction. For example, if the impact is determined in six directions, the result value of the second AI model 920 may include a front impact, a rear impact, a front left impact, a front right impact, a rear left impact, and a rear right impact. After determining whether the AI model performs the self-diagnosis and the impact direction, the processor 180 may select the ECU module to be self-diagnosed according to the impact direction (S440). Hereinafter, details will be described with reference to FIG. 10.

Figure 10:
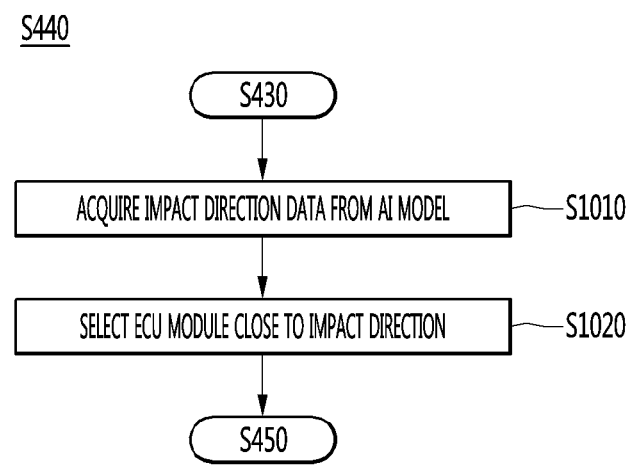
FIG. 10 illustrates an ECU model selecting process according to an embodiment of the present invention.

FIG. 10 illustrates an ECU model selecting process according to an embodiment of the present invention.

Referring to FIG. 10, if the result value output from the AI model indicates information about the impact that requires the self-diagnosis in the first direction or the second direction, the processor 180 may select an ECU module to be self-diagnosed according to information about the impact, and perform the self-diagnosis on the selected module.

In detail, the processor 180 may acquire impact direction data from the AI model (S1010) and select an ECU module close to the corresponding impact direction (S1020).

The ECU module may include an engine control unit module. Specifically, the ECU (PCM) as the engine control device may include a module having functions such as the control of an ignition timing, the limit setting (fuel cut) of an engine speed, the control of the amount of fuel injected according to a temperature and other conditions, an idle state management, and cam timing control (VVT engine, etc.). In addition, the ECU module may include an ABS module, a VDC-Vehicle Dynamic control modules, a safety/convenience management module such as tire pressure monitoring (TPM) sensor, a speed limiter module, and a headlight automatic control module, but the present invention is not limited thereto.

According to one embodiment of the present invention, if the AI model determines that the impact that requires self-diagnosis has occurred in the front left of the vehicle, the processor 180 may acquire left front data of the vehicle in the impact direction, and select the ECU module to perform the self-diagnosis by arranging the ECU modules close to the left front of the vehicle. That is, the selected ECU may include a module that is close to an impact occurrence location than the module that is not selected.

As another example, if the impact that requires self-diagnosis occurs, the user may preset and store a list of ECU modules to perform self-diagnosis according to the impact direction. In addition, if the important ECU module is selected and it is determined that the impact requires self-diagnosis regardless of the impact direction, the processor 180 may set the corresponding module to be first diagnosed, and a mapping table in which the self-diagnosis priorities are mapped may be used.

According to one embodiment of the present invention, if the processor 180 selects the ECU module to perform self-diagnosis, the processor 180 may perform self-diagnosis (S450), and output a self-diagnosis result (S460).

FIG. 11 illustrates a notification display according to an embodiment of the present invention.

Referring to FIG. 11, if the ECU module to perform self-diagnosis is set, the processor 180 performs self-diagnosis on the corresponding module (S450). The self-diagnosis may determine whether the part is normally operating, whether a failure has occurred and a repair is required, and the like.

After the self-diagnosis is performed, the processor 180 controls the output unit 150 so that a control signal for outputting the self-diagnosis result is output to the output unit 150. The output unit 150 may output the output data using the control signal obtained from the processor 180 (S460).

FIG. 11 is a diagram illustrating displaying a notification based on self-diagnosis according to an embodiment of the present invention. If it is determined that the impact requires self-diagnosis, the processor 180 may self-diagnose the parts in the AR device, and control the output unit 150 to output the self-diagnosis result.

According to one embodiment of the present invention, if the self-diagnosis result is abnormal or warning, the processor may provide abnormality diagnosis information of the corresponding part to a service center.

In detail, the output unit 150 outputs the self-diagnosis result received from the processor 180. The display method may include three steps of normal, abnormal, and warning according to the state of the component as a result of self-diagnosis. The processor 180 may control the output unit to output different colors according to normal, abnormal, and warning stages.

For example, the processor may control the output unit 150 to display a green color 1112 if the corresponding module is normal, a yellow color 1113 if the corresponding module is abnormal, and a red color 1111 if the corresponding module is warning.

According to one embodiment of the present invention, the self-diagnosis result may be displayed as a warning light in the vehicle, and may be output on a display mounted on the vehicle. In addition, a notification display may be output by a mobile device application interworking with the vehicle.

If the self-diagnosis result is abnormal or warning after controlling the output unit 150 to output the self-diagnosis result, the processor 180 may provide the abnormality diagnosis information of the corresponding part to the service center (S470). Hereinafter, details will be described with reference to FIG. 12.

Figure 12:
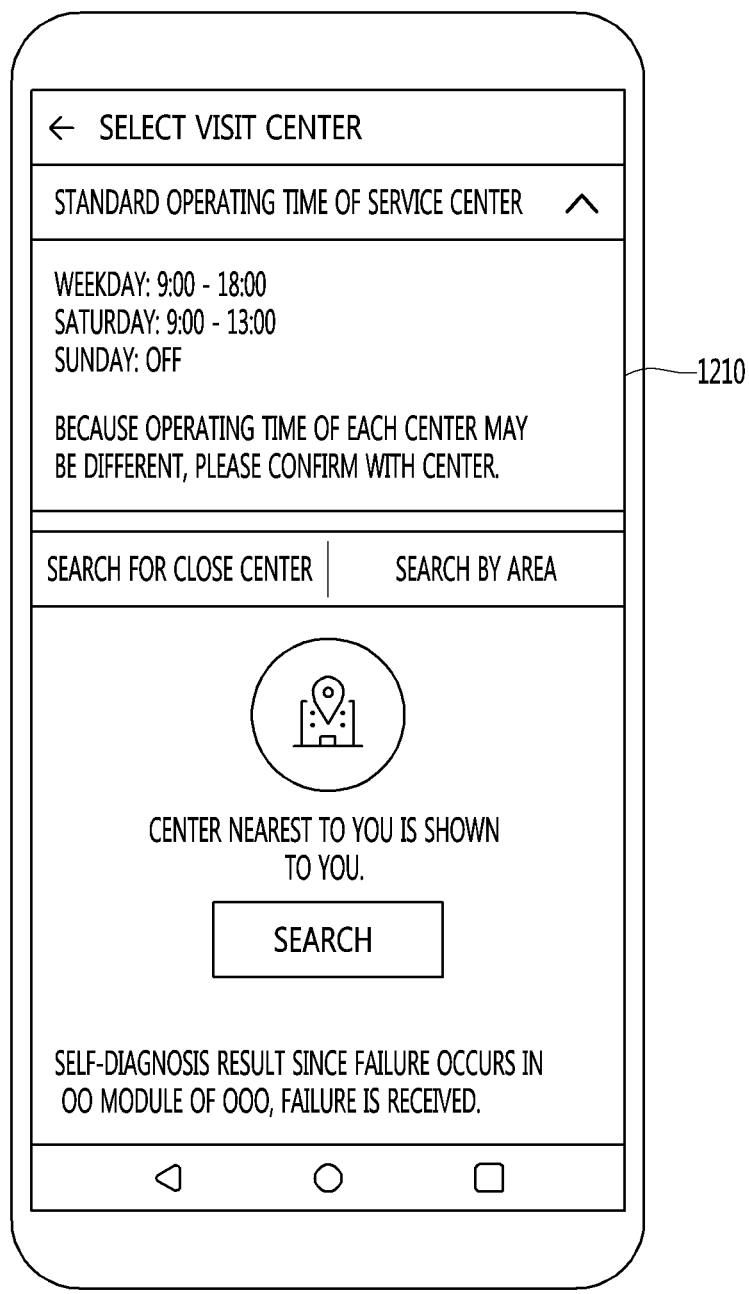
FIG. 12 illustrates an abnormality diagnosis information providing display according to an embodiment of the present invention.

FIG. 12 illustrates an abnormality diagnosis information providing display according to an embodiment of the present invention.

Referring to FIG. 12, according to one embodiment of the present invention, if the self-diagnosis result is abnormal or warning, abnormality diagnosis information of the corresponding part may be provided to the service center. The processor 180 may provide the self-diagnosis result to the service center so that the state of the ECU module in the AI device of the user is provided to the server.

According to one embodiment of the present invention, if an artificial intelligence device mounted on a vehicle has parts damaged due to a contact accident or an impact of a certain level or more, an electronic control unit (ECU) can be used to perform self-diagnosis on modules that are expected to be damaged. In addition, before inputting a gyroscope sensor value, a GPS sensor value, and an acceleration sensor value to an artificial intelligence model as an input value, whether the sensor values satisfy a predetermined reference value is first determined, thereby reducing the computational complexity of the complex calculation. Therefore, the system may have the efficiency and accuracy.

The present invention may be embodied as computer-readable codes on a program-recorded medium. The computer-readable recording medium may be any recording medium that stores data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the terminal.

What is claimed is:

1. An artificial intelligence device mounted on a vehicle, comprising:
   a sensor configured to acquire sensor data based on an impact being applied to the vehicle;
   an output interface configured to output information; and
   a processor configured to:
      input data acquired by the sensor to an artificial intelligence model to obtain a result value output by the artificial intelligence model,
      determine whether to perform self-diagnosis and an impact direction according to the result value, and
      based on the self-diagnosis being performed on an engine control unit (ECU) module of the vehicle, control the output interface to output a self-diagnosis result based on the impact direction,
   wherein the sensor comprises a gyroscope sensor, an acceleration sensor, a global positioning system (GPS) sensor, and a proximity sensor, and
   wherein the processor is configured to:
      input data acquired from the gyroscope sensor, the acceleration sensor, and the GPS sensor to the artificial intelligence model (i) based on a value of the proximity sensor being less than or equal to a first reference value, and a value of the gyroscope sensor being greater than or equal to a second reference value, or (ii) based on the value of the proximity sensor being less than or equal to the first reference value, and a value of the acceleration sensor being greater than or equal to a third reference value.

2. The artificial intelligence device according to claim 1, wherein the artificial intelligence model includes a neural network having a weight configured to be adjusted by training using impact information as a result value and the sensed values of the GPS sensor, the gyroscope sensor, and the acceleration sensor as an input value, and
   wherein the impact information includes information about impact that does not require self-diagnosis, information about impact that requires self-diagnosis in a first direction, and information about impact that requires self-diagnosis in a second direction.

3. The artificial intelligence device according to claim 1, wherein the artificial intelligence model includes:
   a first artificial intelligence model having a first weight configured to be adjusted by training using whether the impact requires the self-diagnosis as a result value and the sensed values of the gyroscope sensor and the acceleration sensor as an input value; and
   a second artificial intelligence model having a second weight configured to be adjusted by training using the impact direction as a result value and the sensed values of the GPS sensor, the gyroscope sensor, and the acceleration sensor as an input value.

4. The artificial intelligence device according to claim 1, wherein the processor is configured to:
based on the value of the proximity sensor being less than or equal to the first reference value and the value of the gyroscope sensor being greater than or equal to the second reference value, or based on the value of the proximity sensor being less than or equal to the first reference value and the value of the acceleration sensor being greater than or equal to a third reference value, input the data acquired from the gyroscope sensor, the acceleration sensor, and the GPS sensor, and data acquired from the proximity sensor to the artificial intelligence model.

5. The artificial intelligence device according to claim 2, wherein the processor is configured to, based on the result value output from the artificial intelligence model indicating information about the impact that requires the self-diagnosis in the first direction, select an ECU module to be self-diagnosed according to information about the impact, and to perform the self-diagnosis on the selected ECU module.

6. The artificial intelligence device according to claim 5, wherein the selected ECU module is a module that is closer to an impact occurrence location of the impact than another ECU module that is not selected.

7. The artificial intelligence device according to claim 1, wherein the processor is configured to, based on the self-diagnosis result of the ECU module being an abnormal or warning result, provide abnormality diagnosis information of a corresponding part to a service center.

8. A self-diagnosis method comprising:
acquiring data from a gyroscope sensor, an acceleration sensor, a global positioning system (GPS) sensor, and a proximate sensor;
determining, by a processor, whether the data satisfies a predetermined reference value;
inputting, by the processor, the data to an artificial intelligence model based on the data satisfying the predetermined reference value;
acquiring a result value output by the artificial intelligence model;
determining whether to perform self-diagnosis and an impact direction according to the result value;
performing, by the processor, self-diagnosis on an engine control unit (ECU) module of a vehicle that requires self-diagnosis based on the impact direction; and
outputting, by an output interface, a self-diagnosis result,
wherein the artificial intelligence model includes a neural network including a weight configured to be adjusted by training using impact information as a result value and sensed values of the GPS sensor, the gyroscope sensor, and the acceleration sensor as an input value,
wherein the impact information includes information about an impact that does not require the self-diagnosis, information about an impact that requires the self-diagnosis in a first direction, and information about an impact that requires the self-diagnosis in a second direction, and
wherein inputting the data to the artificial intelligence model comprises:
inputting the data acquired from the gyroscope sensor, the acceleration sensor, and the GPS sensor to the artificial intelligence model (i) based on a value of the proximity sensor being less than or equal to a first reference value, and the value of the gyroscope sensor being greater than or equal to a second reference value, or (ii) based on the value of the proximity sensor being less than or equal to the first reference value, and the value of the acceleration sensor being greater than or equal to a third reference value.

9. A non-transitory recording medium having recorded thereon a method for performing self-diagnosis, the method comprising:
acquiring data from a gyroscope sensor, an acceleration sensor, a global positioning system (GPS) sensor, and a proximate sensor;
determining, by a processor, whether the data satisfies a predetermined reference value;
inputting, by the processor, the data to an artificial intelligence model based on the data satisfying the predetermined reference value;
determining whether to perform self-diagnosis and an impact direction according to a result value output from the artificial intelligence model;
performing, by the processor, self-diagnosis on an engine control unit (ECU) module of a vehicle that requires self-diagnosis based on the impact direction; and
outputting, by an output interface, a self-diagnosis result,
wherein the artificial intelligence model includes a neural network including a weight configured to be adjusted by training using impact information as a result value and sensed values of the GPS sensor, the gyroscope sensor, and the acceleration sensor as an input value,
wherein the impact information includes information about an impact that does not require the self-diagnosis, information about an impact that requires the self-diagnosis in a first direction, and information about an impact that requires self-diagnosis in a second direction,
wherein inputting the data to the artificial intelligence model comprises:
inputting the data acquired from the gyroscope sensor, the acceleration sensor, and the GPS sensor to the artificial intelligence model (i) based on a value of the proximity sensor being less than or equal to a first reference value, and the value of the gyroscope sensor being greater than or equal to a second reference value, or (ii) based on the value of the proximity sensor being less than or equal to the first reference value, and the value of the acceleration sensor being greater than or equal to a third reference value.

10. The artificial intelligence device according to claim 1, wherein the processor is configured to input the data acquired from the gyroscope sensor, the acceleration sensor, and the GPS sensor to the artificial intelligence model based on the value of the proximity sensor being less than or equal to the first reference value, and the value of the gyroscope sensor being greater than or equal to the second reference value.

11. The artificial intelligence device according to claim 1, wherein the processor is configured to the data acquired from the gyroscope sensor, the acceleration sensor, and the GPS sensor to the artificial intelligence model based on the value of the proximity sensor being less than or equal to the first reference value, and the value of the acceleration sensor being greater than or equal to the third reference value.

12. The self-diagnosis method according to claim 8, wherein inputting the data to the artificial intelligence model further comprises:

inputting the data acquired from the gyroscope sensor, the acceleration sensor, the GPS sensor, and the proximate sensor to the artificial intelligence model (i) based on the value of the proximity sensor being less than or equal to the first reference value, and the value of the gyroscope sensor being greater than or equal to the second reference value, or (ii) based on the value of the proximity sensor being less than or equal to the first reference value, and the value of the acceleration sensor being greater than or equal to the third reference value.

13. The self-diagnosis method according to claim 8, wherein inputting the data to the artificial intelligence model comprises:

inputting the data acquired from the gyroscope sensor, the acceleration sensor, and the GPS sensor to the artificial intelligence model based on the value of the proximity sensor being less than or equal to the first reference value, and the value of the gyroscope sensor being greater than or equal to the second reference value.

14. The self-diagnosis method according to claim 8, wherein inputting the data to the artificial intelligence model comprises:

inputting the data acquired from the gyroscope sensor, the acceleration sensor, and the GPS sensor to the artificial intelligence model based on the value of the proximity sensor being less than or equal to the first reference value, and the value of the acceleration sensor being greater than or equal to the third reference value.

15. The recording medium according to claim 9, wherein inputting the data to the artificial intelligence model further comprises:

inputting the data acquired from the gyroscope sensor, the acceleration sensor, the GPS sensor, and the proximate sensor to the artificial intelligence model (i) based on the value of the proximity sensor being less than or equal to the first reference value, and the value of the gyroscope sensor being greater than or equal to the second reference value, or (ii) based on the value of the proximity sensor being less than or equal to the first reference value, and the value of the acceleration sensor being greater than or equal to the third reference value.

16. The recording medium according to claim 9, wherein inputting the data to the artificial intelligence model comprises:

inputting the data acquired from the gyroscope sensor, the acceleration sensor, and the GPS sensor to the artificial intelligence model based on the value of the proximity sensor being less than or equal to the first reference value, and the value of the gyroscope sensor being greater than or equal to the second reference value.

17. The recording medium according to claim 9, wherein inputting the data to the artificial intelligence model comprises:

inputting the data acquired from the gyroscope sensor, the acceleration sensor, and the GPS sensor to the artificial intelligence model based on the value of the proximity sensor being less than or equal to the first reference value, and the value of the acceleration sensor being greater than or equal to the third reference value.

\* \* \* \* \*